Dec. 26, 1939.  B. L. HILL  2,184,454
SQUEEZER DEVICE
Filed June 26, 1936
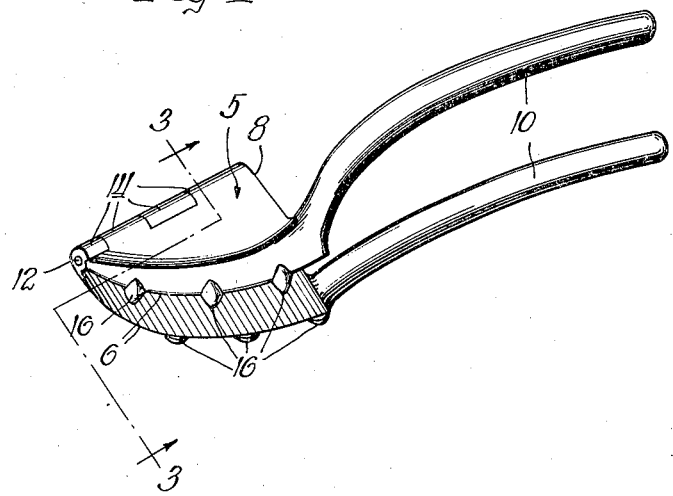
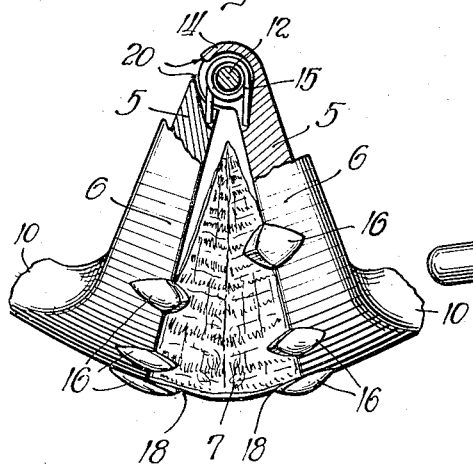
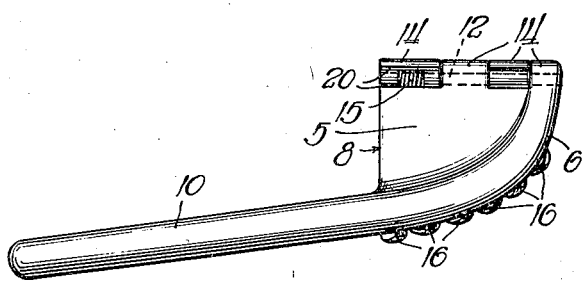
Inventor:
Bruce L. Hill.
By Brown, Jackson, Boettcher & Dienner
Attys.

Patented Dec. 26, 1939

2,184,454

UNITED STATES PATENT OFFICE 2,184,454

SQUEEZER DEVICE

Bruce L. Hill, Chicago, Ill.

Application June 26, 1936, Serial No. 87,413

4 Claims. (Cl. 100—41)

This invention relates to a squeezer device for extracting juice from fruit, such as lemons, limes, and the like.

While the device which I shall describe hereinafter in connection with the drawing is a squeezer device adapted for picking up, squeezing, and releasing half segments of the fruit, it is to be understood that it may be formed to pick up whole segments or any other desired pieces of the fruit. As hereinafter employed, the term "segment" means one of the slices obtained by cutting the fruit axially, such as by quartering, while the term "half segment" means the portion or slice of fruit obtained by transverse or radial cutting of a segment.

One of the main objects of my invention is to provide a squeezer device which is adapted to pick up pieces of the fruit, slowly squeeze out the juice, and release the pulp and rind. The device may be placed on the serving dish and passed from person to person with the half segments or other pieces of fruit.

It is also an object of my invention to provide a device of simple and inexpensive construction, of pleasing appearance, and which may be handled and operated conveniently; also a device composed of few parts adapted for convenient assembly, and a device which is strong but light in weight, fits comfortably in the hand and which will withstand the fruit juices and will clean easily in hot water.

Further objects and advantages of my invention will appear from the following detailed description taken in connection with the accompanying drawing, in which:

Figure 1 is a perspective view of a device embodying the present invention;

Figure 2 is a side elevational view of the same; and

Figure 3 is an end view on an enlarged scale, partially in section and showing the manner in which the device operates to pick up, hold, and squeeze the piece of fruit.

Referring now in detail to the drawing, the squeezer device shown comprises a pair of jaw members 5 formed, preferably, of suitable metal that will withstand the juices of the fruit with which the device is employed.

The jaw members 5 are rounded at their forward ends at 6 to conform with the rounded end of the segment or half segment of fruit shown at 7 in Figure 3. The rear ends 8 are shown normal to the upper margins of the jaw members for use with half segments of the fruit.

An integral handle 10 extends generally longitudinally from the rear end of the lower margin of each jaw member 5, and a pivot 12, disposed longitudinally with respect to the jaw members, pivotally connects the upper margins of the jaw members. In the illustrated embodiment of the invention, the upper margins of the jaw members are provided with meshing pivot lugs 14, and the pivot 12 extends through aligned openings in these lugs and is suitably secured against endwise displacement as by knurling the pin, or otherwise. A spring 15, coiled about the pivot 12, with its ends in cooperation with the respective jaw members, swings the jaw members open and normally holds said jaw members yieldingly in open position. Stops 20 on the lugs 14 and jaw members 5 limit the opening movement of the jaw members under the action of the spring 15.

The lower and forwardly rounded margin of each jaw member has integral prongs 16 for picking up the piece of fruit, as shown in Figure 3, and holding same against being squeezed out from between the jaw members 5 as said jaw members are closed or pressed together against the action of the spring 15. The prongs 16 extend laterally inwardly from the respective jaw members 5 and are preferably disposed in staggered relation as shown in Figure 3 to mesh when the jaw members are closed. The inner surfaces of the jaw members are preferably flat, as shown.

In use, the half segments or segments of the lemon or other fruit are placed, for example, upon the serving dish with the rind down. This raises the opposite edges, as shown at 18 in Figure 3, so that when the jaw members are applied over the piece of fruit and closed by grasping the handles 10 in one hand and pressing the same together, the prongs 16 will engage beneath the piece of fruit so that it may be picked up by the squeezer device, and at the same time will be prevented from being squeezed out from between the jaw members as the jaw members are pressed together.

I do not intend to be limited to the precise details shown or described.

I claim:

1. In a fruit juice extractor, a pair of normally superposed rigid jaw members each in the general shape of a quadrant of a circle, a pivot joining said jaw members together along corresponding radii which define one marginal edge of each of said members, and a handle projecting outwardly from each jaw member and at substantially right angles to the other radii which defines another marginal edge of each of said jaw members.

2. In a fruit juice extractor, a pair of normally superposed rigid jaw members each in the general shape of a quadrant of a circle, a pivot joining said jaw members together along corresponding radii which define one marginal edge of each of said members, a handle projecting outwardly from each jaw member and at substantially right angles to the other radii which defines another marginal edge of each of said jaw members, and means along the arcuate portion of said jaw members intercepted by said radii for picking up a piece of fruit and holding the same against being squeezed out from between said jaws as said jaws are pressed together.

3. In a fruit juice extractor, a pair of normally superposed rigid jaw members each in the general shape of a quadrant of a circle, a pivot joining said jaw members together along corresponding radii which define one marginal edge of each of said members, a handle projecting outwardly from each jaw member and at substantially right angles to the other radii which defines another marginal edge of each of said jaw members, and means along the arcuate portion of said jaw members intercepted by said radii for picking up a piece of fruit and holding the same against being squeezed out from between said jaws as said jaws are pressed together, said last means comprising prongs extending laterally inwardly from the arcuate portion of each of said jaw members and disposed in staggered relation to mesh when said jaws are closed.

4. In a fruit juice extractor, a pair of normally superposed rigid jaw members each in the general shape of a quadrant of a circle, a pivot joining said jaw members together along corresponding radii which define one marginal edge of each of said members, a handle projecting outwardly from each jaw member and at substantially right angles to the other radii which defines another marginal edge of each of said jaw members, and prongs extending laterally inwardly from the arcuate portion of each of said jaw members intercepted by said radii for picking up a piece of fruit and holding the same against being squeezed out from between said jaws as said jaws are pressed together, said prongs being disposed in staggered relation to mesh when said jaws are closed.

BRUCE L. HILL.